United States Patent
Moffat et al.

(10) Patent No.: US 7,359,053 B2
(45) Date of Patent: Apr. 15, 2008

(54) OPTICAL ARRAY WITH BEAM ALIGNMENT FEATURE

(75) Inventors: Steven Harold Moffat, Mississippi Mills (CA); Stephen Robert de Hennin, Ottawa (CA); Martin Matthews, Kanata (CA); David William Charles Markin, Ottawa (CA); Philip Duggan, Ottawa (CA)

(73) Assignee: JDS Uniphase Inc., Ottawa, Ontario (CA)

( * ) Notice: Subject to any disclaimer, the term of this patent is extended or adjusted under 35 U.S.C. 154(b) by 536 days.

(21) Appl. No.: 11/069,214

(22) Filed: Mar. 1, 2005

(65) Prior Publication Data

US 2005/0286393 A1    Dec. 29, 2005

Related U.S. Application Data

(60) Provisional application No. 60/548,867, filed on Mar. 2, 2004.

(51) Int. Cl.
  *G01B 11/00* (2006.01)
(52) U.S. Cl. .................. 356/399; 356/400; 356/401
(58) Field of Classification Search ............ 356/399, 356/400; 359/290, 291, 259; 385/16–18, 385/24, 37, 130
See application file for complete search history.

(56) References Cited

U.S. PATENT DOCUMENTS

| 4,071,754 | A  |   | 1/1978  | Roulund |
| 5,229,597 | A  | * | 7/1993  | Fukatsu ................ 250/208.2 |
| 6,498,872 | B2 |   | 12/2002 | Bouevitch et al. |
| 6,707,959 | B2 |   | 3/2004  | Ducellier et al. |
| 6,792,185 | B1 |   | 9/2004  | Ahrens |
| 6,922,273 | B1 | * | 7/2005  | Maheshwari et al. ....... 359/291 |
| 6,979,061 | B1 | * | 12/2005 | Lumbis et al. ............. 303/7 |
| 7,019,883 | B2 | * | 3/2006  | Moon et al. ............... 359/290 |
| 7,088,882 | B2 | * | 8/2006  | Ducellier et al. .......... 385/17 |
| 7,126,740 | B2 | * | 10/2006 | Szczepanek et al. ....... 359/290 |
| 7,177,493 | B2 | * | 2/2007  | McGuire, Jr. .............. 385/16 |

* cited by examiner

*Primary Examiner*—Layla G. Lauchman
(74) *Attorney, Agent, or Firm*—Teitelbaum & MacLean; Neil Teitelbaum; Doug MacLean

(57) ABSTRACT

An array of optical elements for processing a spatially dispersed optical beam including monitoring optical elements for determining the position of the optical beam in the array is disclosed. The monitoring optical elements have a width that varies in ay direction normal to the array axis, enabling the determination of the beam position across the monitoring elements in both x and y directions. The monitoring optical elements are preferably disposed in the end portions of the array for the beam tilt determination. The optical elements can be e.g. liquid crystal pixels or micromirrors.

19 Claims, 9 Drawing Sheets

OPTICAL ARRAY WITH BEAM ALIGNMENT FEATURE

CROSS-REFERENCE TO RELATED APPLICATIONS

This application claims priority of U.S. Provisional Patent Application No. 60/548,867 filed Mar. 2, 2004, entitled "Pixel Alignment Feature", which is incorporated herein by reference for all purposes.

FIELD OF THE INVENTION

The present invention relates to optical systems having arrays of optical elements for spectrally-selective light processing, and more particularly to optical arrays having beam alignment features.

BACKGROUND OF THE INVENTION

There are many applications wherein arrays of optical elements are used for spectrally-selective processing of an optical beam, including optical spectrometry, optical performance monitoring, in wavelength blockers and wavelength switches. Depending on the application and a preferred technology, such arrays are typically formed by pixelated liquid crystal cells, multiple individually controlled micro-mirrors, or multiple photo-detectors such as CCD elements; they can be used to perform such operations as blocking or transmitting incident light based on its polarization, re-directing it in space, or converting it into electrical signals.

FIG. 1 shows a typical prior-art configuration, wherein a wavelength dispersed optical beam 102 impinges on a linear pixelated array 101 composed of rectangular optical elements 100 disposed along an axis. The optical beam is typically focused on the array and is dispersed in space along a so-called dispersion axis so that different optical elements of the array receive different spectral components of the beam, or different wavelengths. This configuration is used for example in wavelength blockers, dynamic gain equalizers and wavelength switches disclosed in U.S. Pat. No. 6,498,872 issued to Bouevitch, et. al, and in WDM switches disclosed in U.S. Pat. No. 6,707,959 issued to Ducellier, et al., both of which are assigned to the assignee of this application, and in many other commercially available optical devices and modules.

In many applications, it is important to accurately align the dispersed optical beam and the array, i.e. to align the axis of dispersion with the array axis. A problem of beam alignment arises in many optical systems, and multitude of beam alignment approaches exist in the prior art. For example, U.S. Pat. No. 4,071,754 issued to Roulund teaches a beam alignment detector comprised of a beam detector chip and an array of fiber optic ends orthogonal to the direction of laser beam scan. U.S. Pat. No. 6,792,185 to Ahrens, et al. discloses an optical structure for laser beam-fiber end alignment consisting of an optical bundle comprised of an array of optical fibers, arranged surrounding the receiving fiber.

Although the aforementioned inventions appear to perform their intended functions, they provide solutions requiring additional array structures that may significantly complicate the aforementioned WDM modules. While the task of finding efficient and cost-effective approaches to optical alignment requires solutions targeted to a specific system, these and other prior-art beam alignment methods are targeted to optical systems which are different from the one shown in FIG. 1.

It would be beneficial to the applications to have a relatively simple method of beam-array alignment in WDM modules and systems which wouldn't involve significant changes to the modules and would enable 1) an initial alignment of the beam to the array during assembly of the optical system, 2) monitoring drifts in the beam position through the manufacturing process, for instance, during packaging, and 3) monitoring drifts in the beam position over the life of the module, e.g. to assist in performance degradation diagnostics. However, to the best of our knowledge, heretofore there have been no simple approach to accurately measure the beam position and beam tilt relative to the array of rectangular elements without bringing at least a portion of the dispersed beam outside the array area, therefore strongly complicating alignment diagnostics for systems comprising pixel arrays for spectrally-selective processing of dispersed optical beams.

An object of this invention is to provide an array of optical elements for processing of a spatially dispersed beam of light with features enabling identification of the beam position in the array.

Another object of this invention is to provide an array of optical elements for processing of a spatially dispersed beam of light incorporating beam alignment features.

Another object of this invention is to provide a method for detecting of alignment of a dispersed beam of light relative to an array of beam-processing optical elements.

SUMMARY OF THE INVENTION

In accordance with the invention, an array of optical elements for processing a light beam spectrally dispersed along a first axis is provided, the array comprising: a plurality of optical elements disposed along a second axis, each optical element having a beam receiving surface coplanar with the second axis for receiving a portion of the spectrally dispersed beam, the plurality of optical elements comprising: a) a first set of optical elements each having a width of the beam receiving surface which is substantially constant in a direction normal to the second axis and, b) a second set of optical elements each having a width of the beam receiving surface which changes in a direction normal to the second axis; wherein the second set comprises at least one optical element for providing a spectral feature dependent on the beam position relative to the second axes.

In accordance with another aspect of this invention, a method is provided for detecting alignment of a beam of light dispersed along a first axis relative to a linear array of rectangular optical elements disposed along a second axis, the method comprising the steps of: providing at least one monitoring optical element for receiving a portion of the beam of light, the monitoring optical element having a width varying in a direction orthogonal to the second axis; providing sensing means for measuring the portion of the beam of light received by the monitoring optical element; and, measuring the portion of the beam of light received by the monitoring optical element for determining a relative position of the first and second axes at the monitoring optical element. In a preferred embodiment, the step of measuring the portion of the beam of light received by the monitoring optical element comprises the steps of: obtaining a combined spectral response of the monitoring optical element and at least a portion of the linear array of rectangular optical elements; and, identifying a spectral feature associated with the monitoring optical element in the combined spectral response.

BRIEF DESCRIPTION OF THE DRAWINGS

Exemplary embodiments of the invention will now be described in conjunction with the drawings in which.

DETAILED DESCRIPTION OF EXEMPLARY EMBODIMENTS

Several definitions and notations used hereinafter in this specification will now be introduced.

Exemplary embodiments of an array of optical elements with beam alignment features according to the present invention will be described in reference to an optical system formed by a linear array of optical elements, and a dispersion element forming the spatially dispersed optical beam. The optical system can be for example a part of a WDM blocker, or a WDM optical switch.

Figure 1:
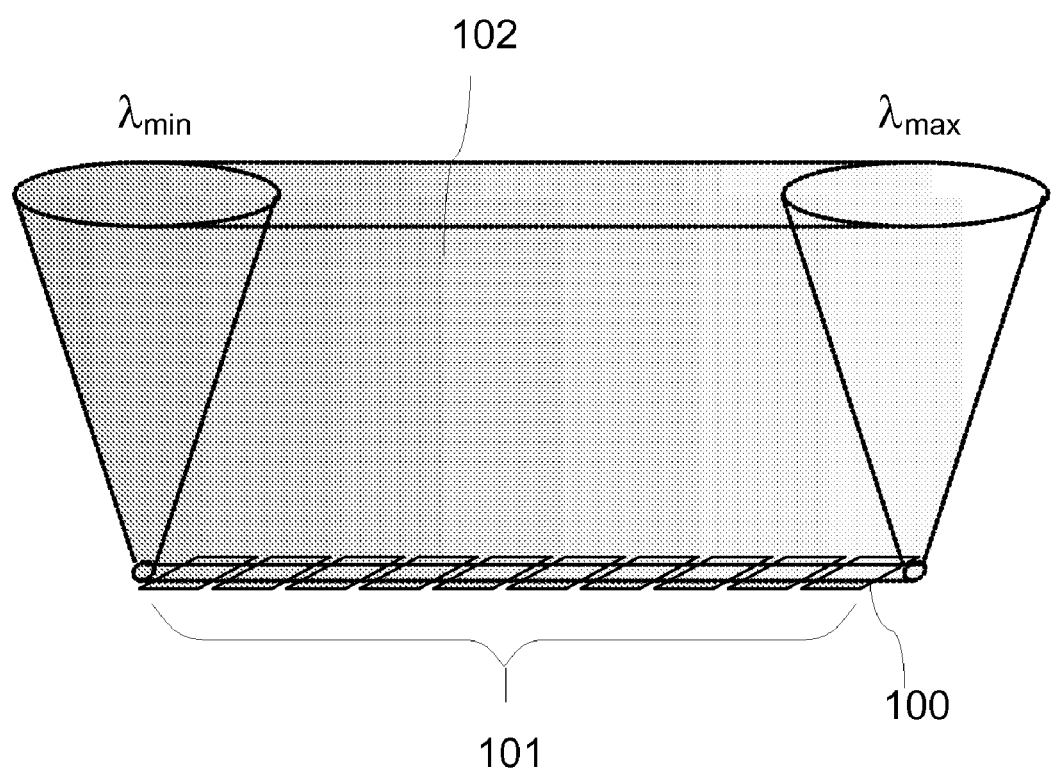
FIG. 1 is a diagram of a wavelength dispersed optical beam impinging on a pixel array according to prior art.
Figure 2:
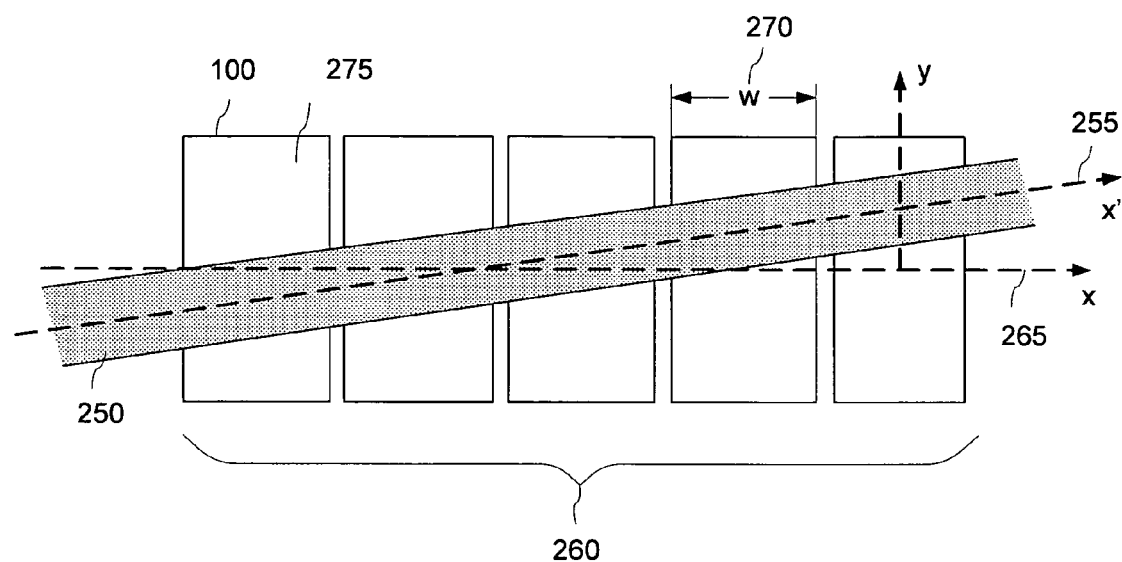
FIG. 2 is a diagram of beam and pixel array alignment.

FIG. 2 shows a portion 260 of the array, and illustrates the beam-array alignment considerations pertinent to the present invention. The linear array 260 is composed of optical elements 100 having rectangular beam receiving surface 275.

The words "linear array" in the context of this specification mean a plurality of elements positioned sequentially along a line 265 one after another. The line 265 is referred to hereinafter as an array axis. The array axis 265 is generally coplanar with a rectangular beam-receiving surface 275 of each of the optical elements 100, but can be either straight or curved; for example the optical elements 100 can be disposed on a spherical surface.

The optical elements 100 can be pixels of a liquid crystal (LC) cell, micro-mirrors such as those used in MEMS, photo-detectors or other optical elements capable of performing an operation upon incident light resulting in a signal which depends on the area size of the optical element exposed to the beam. These optical elements 100 forming the array will be referred to hereinafter also as pixels, and the shape of the beam receiving surface of the optical elements will be referred to as a pixel shape.

The optical beam impinging upon the array 260 is spatially dispersed in a direction generally normal to a direction of its propagation, exposing a narrow area 250 of the array extended along an axis 255, so that the beam wavelength $\lambda$ monotonically changes along it. The dispersion element not shown herein forms the dispersed optical beam from a focused or collimated laser beam incident thereupon by directing the beam energy to different locations along the axis 255 depending on the wavelength $\lambda$. A position of the exposed area 250 across the pixel array or a portion thereof will be referred to hereinafter as the beam position.

The optical beam impinging upon the array 260 is spatially dispersed in a direction generally normal to a direction of its propagation, exposing a narrow area 250 of the array extended along an axis 255, so that the beam wavelength $\square$ monotonically changes along it. The dispersion element not shown herein forms the dispersed optical beam from a focused or collimated laser beam incident thereupon by directing the beam energy to different locations along the axis 255 depending on the wavelength $\square$. A position of the exposed area 250 across the pixel array or a portion thereof will be referred to hereinafter as the beam position.

The axis 255 along which the beam is dispersed is referred to hereinafter as the dispersion axis. The dispersion axis 255 and the array axis 265 are also referred to hereafter in this specification as a first axis and a second axis respectively.

A rectangular coordinate system (x,y) is used in this specification to define the beam position within the array or within a pixel, with the x coordinate axis directed along the array axis 265, and the y coordinate axis directed normally thereto; directions along the x and y coordinates will also be referred to hereinafter as horizontal and vertical directions respectively. The wavelength dispersion of the optical beam can be characterized by its spatial dispersion coefficient $D=d\lambda/dx'$, wherein x' is a coordinate along the dispersion axis 255; the dispersion coefficient D is preferably constant so that the wavelength $\lambda$ of the dispersed optical beam changes linearly from one end of the pixel array to another.

In the configuration shown in FIG. 2, the dispersed optical beam and the array are misaligned, so that the dispersion axis 255 is tilted relative to the array axis 265. Such a misalignment typically causes a performance degradation of a system using the array, which can be detrimental for applications.

The present invention provides a means and a method for measuring the position of the optical beam in the array, and can be advantageously used to facilitate initial alignment of the optical system comprising the array, or for alignment diagnostics at later stages in the assembly process or after the optical system is brought into operation.

This objective is achieved in the present invention by adding monitoring pixels which are shaped differently than other pixels of the array. Typically, pixels of rectangular shape are used in linear pixel arrays for processing of spatially dispersed optical beams. A rectangular pixel have a width 270 which is constant in the vertical direction, which advantageously makes the array performance less sensitive to vertical beam movements, as long as the beam remains within the pixel array. Note that system considerations may still lead to existence of an optimal position of the beam across and within the rectangular pixels. According to the present invention, the monitoring pixels have non-rectangular shape with width that changes in the vertical direction, so that to enable detecting a position of the beam at the monitoring pixels.

A pixel array according to the present invention has at least one monitoring pixel which can be disposed anywhere in the array along the array axis 265. A preferred embodiment has two groups of monitoring pixels disposed at opposing end portions of the array for enabling beam tilt detection.

The optical system employing the pixel array has an operating wavelength range corresponding to a specific number of pixels. By way of example, the optical system having the operating wavelength range spanning from a minimum wavelength $\lambda_{min}$ to a maximum wavelength $\lambda_{max}$ and the dispersion coefficient D requires $\sim N = (\lambda_{max} - \lambda_{min})/(wD)$ pixels, where w is the width of one pixel. The pixel array is however commonly 'oversized', possessing more pixels than needed to span the operating wavelength range. The preferred embodiment of the invention makes use of the pixels outside the operating wavelength range to provide a means to measure the beam position, including the beam tilt. The rectangular pixels, which alone enable the determination of the beam position in x direction, are used in conjunction with the monitoring pixels to determine the beam position along both x and y axes.

Figure 3:
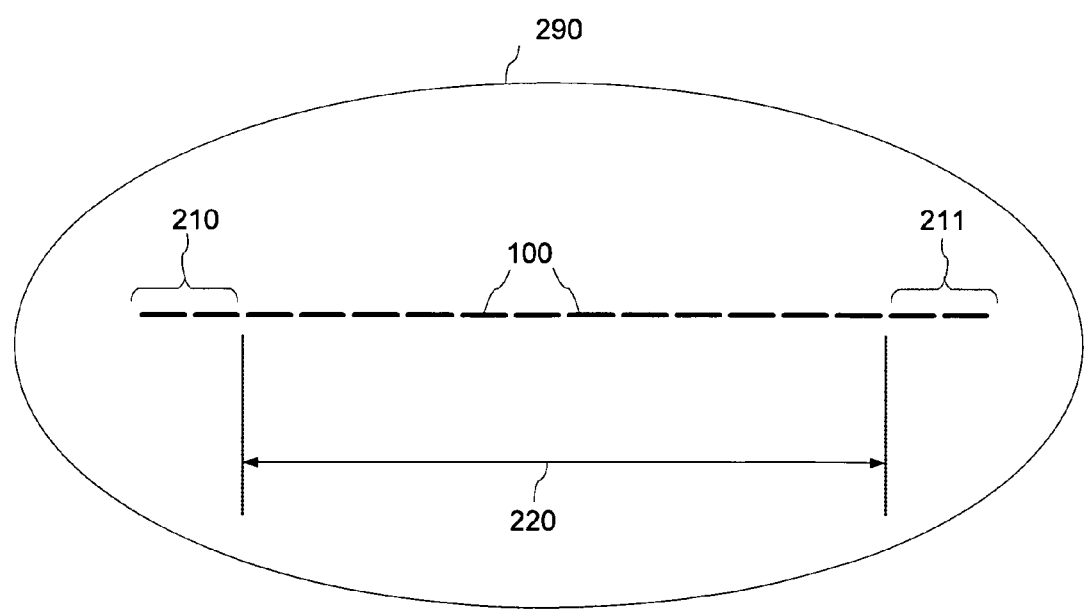
FIG. 3 is a diagram of a pixel array having monitoring pixels outside an operating wavelength range.

With reference to FIG. 3, a pixel array 290 in accordance with the preferred embodiment of the present invention has a first set 220 of rectangular pixels 100 having at least N pixels to span the operating wavelength range of the system, and a second set of pixels formed by two groups of monitoring pixels 210 and 211 disposed at opposing ends of the first pixel set 220.

Using the monitoring pixels, the beam-array alignment can be determined by performing the following steps:

a) with an external light source such as a swept wavelength system, exposing the array to a dispersed beam of light having spectral components spanning wavelength outside the operating wavelength range, so that the both groups 210 and 211 of the monitoring pixels are exposed, b) providing sensing means for detecting resulting signals from the monitoring pixels and preferably also from their neighbors as a function of the beam wavelength, c) detecting said signals and combining them to form a wavelength response of the system comprising the array, which is referred to hereinafter simply as the wavelength response, and d) identifying changes in wavelength positions of spectral features associated with the monitoring pixels, and/or identifying changes in spectral widths thereof.

Several exemplary configurations of the monitoring pixels according to the present invention will now be described along with exemplary methods to determine the beam position from corresponding wavelength responses.

Figure 4A:
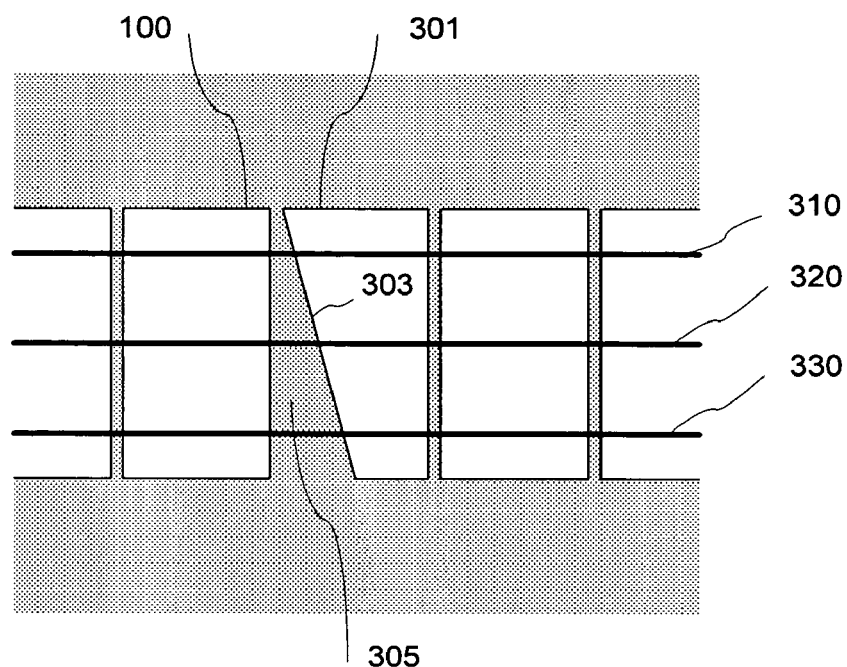
FIG. 4A is a diagram of a pixel configuration with monitoring pixels having varying inter-pixel gap.
Figure 4B:
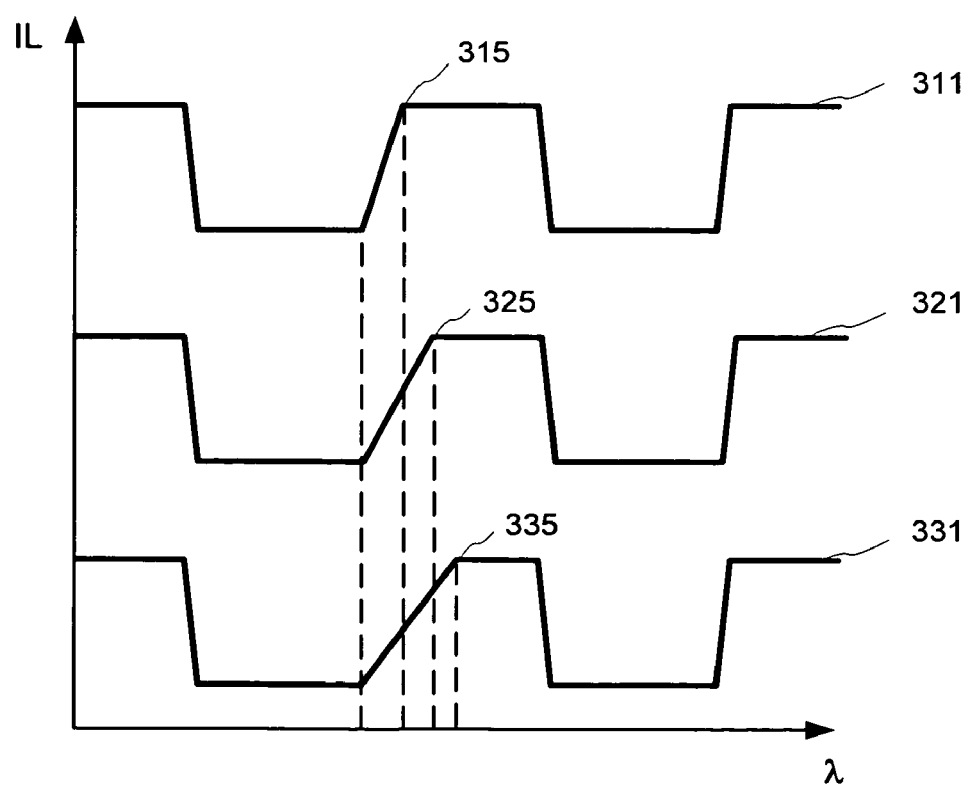
FIG. 4B is a graph of a wavelength response of the pixel configuration shown in FIG. 4A depending on the beam position.

With reference to FIG. 4A, a pixel configuration according to a first exemplary embodiment includes a monitoring pixel 301 having a shape of a wedge disposed between two rectangular pixels. The monitoring pixel 301 has a slanted edge 303 facing a neighboring rectangular pixel 100 so that a variable-width gap 305 is formed between the pixels 301 and 100. Lines 310, 320, and 330 schematically show three different positions of the dispersed optical beam corresponding to the beam movement in the vertical direction. FIG. 4B schematically shows a wavelength response 311, 321, and 331 for the configuration for each of the beam positions 310, 320, and 330 shown in FIG. 4A. The wavelength responses 311, 321, and 331 in FIG. 4B are offset along the vertical axis for clarity; this also applies to corresponding wavelength responses shown hereinbelow in FIGS. 5B, 6B, 7B, 8B, 9B and 10B.

For obtaining this response, a responsivity of the pixels is modulated by reducing it for every other pixel in the array, or turning them off, so that the "off" and "on" pixels in the array are interleaved. As a result, the vertical beam movement can be identified for example by detecting a change in the wavelength position of a spectral feature associated with the edge 303 of the monitoring pixel, the feature which is labeled in FIG. 4B with numerals 315, 325, and 335 for the three respective beam positions.

The variable-width gap of the embodiment shown in FIG. 4A may lead to a non-uniform wavelength response which can be undesirable for some applications. FIGS. 5A, 6A, 7A, and 8A provide exemplary embodiments of the monitoring pixel configurations according to the present invention with uniform inter-pixel gaps.

Figure 5A:
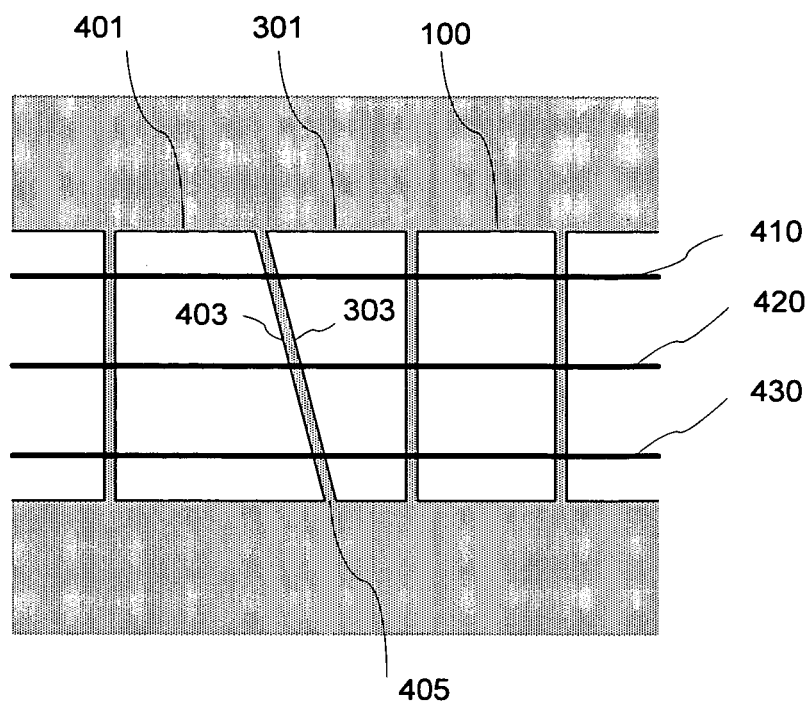
FIG. 5A is a diagram of a pixel configuration with monitoring pixels having a sloped uniform gap.
Figure 5B:
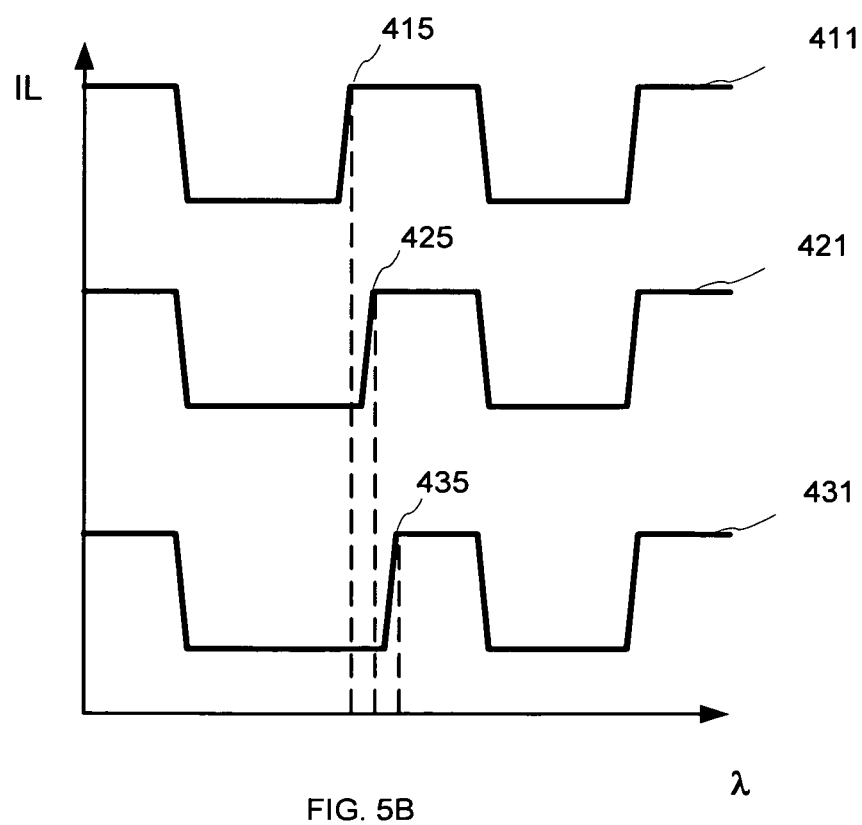
FIG. 5B is a graph of a wavelength response of the pixel configuration shown in FIG. 5A depending on the beam position.

With reference to FIG. 5A, a monitoring pixel configuration according to a second exemplary embodiment includes a second monitoring wedge-shaped pixel 401 with a slanted edge 403 facing the slanted edge 303 of the first monitoring pixel 301 and parallel thereto, forming a monitoring pixel configuration with a uniform slanted gap 405. FIG. 5B schematically shows a wavelength response 411, 421, and 431 for this configuration for each of the beam positions 410, 420 and 430. Similarly to the previous embodiment, the vertical beam movement can be identified by detecting a change in the wavelength position of spectral features associated with the monitoring pixels 301 and 401. By way of example, FIG. 5B shows changing wavelength position of a spectral feature associated with the edge 303 due to the vertical beam movement, the spectral feature labeled with numerals 415, 425, and 435 for beam positions 410, 420 and 430 respectively.

Figure 6A:
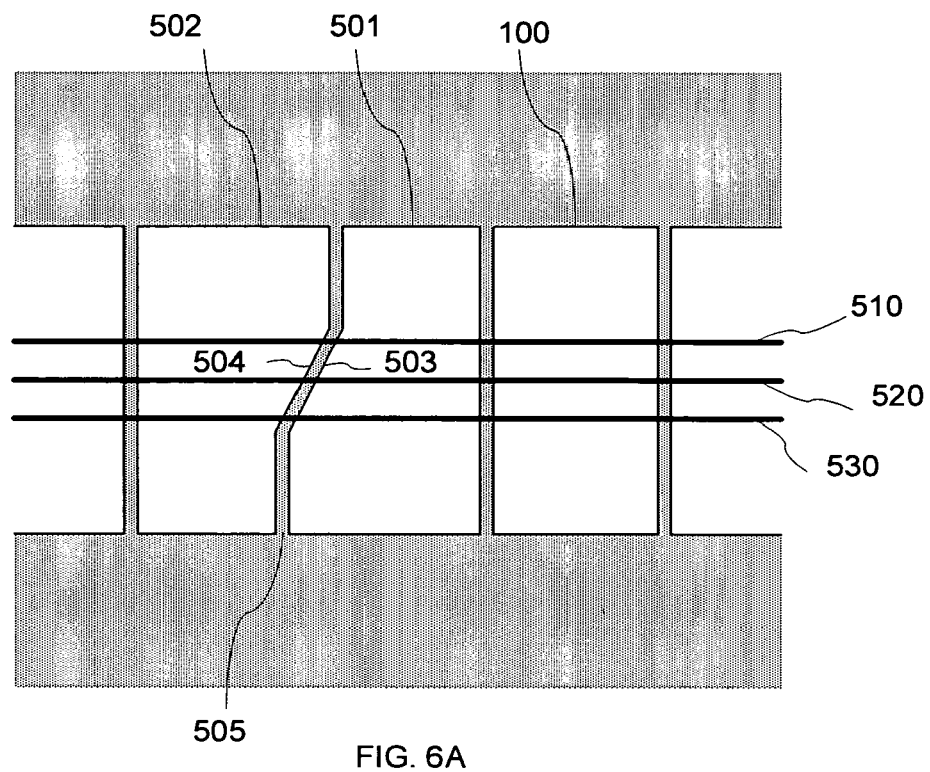
FIG. 6A is a diagram of a pixel configuration with monitoring pixels having a sloped uniform gap restricted to a portion of the pixel's length.
Figure 6B:
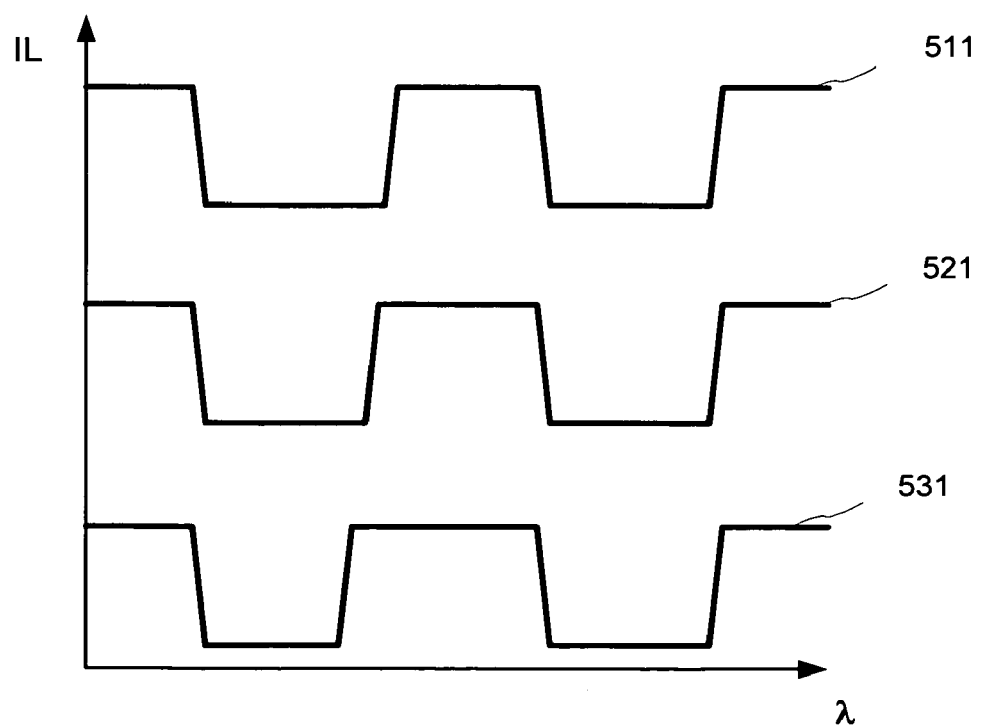
FIG. 6B is a graph of a wavelength response of the pixel configuration shown in FIG. 6A depending on the beam position.

With reference to FIG. 6A, in another embodiment two monitoring pixels 501 and 502 have slanted edges 503 and 504 confined to a portion of pixels' height, and form a uniform gap 505 therebetween with a slanted middle portion. When only a portion of the pixel height is used in the alignment of the optical system, a sloped gap which is limited to that portion of the pixel's length offers an advantage of minimizing the extent of the sloped region in the dispersion axis. Here again, FIG. 6B shows a distinctive wavelength response 511, 521, and 531 for each of the beam positions 510, 520, and 530.

Figure 7A:
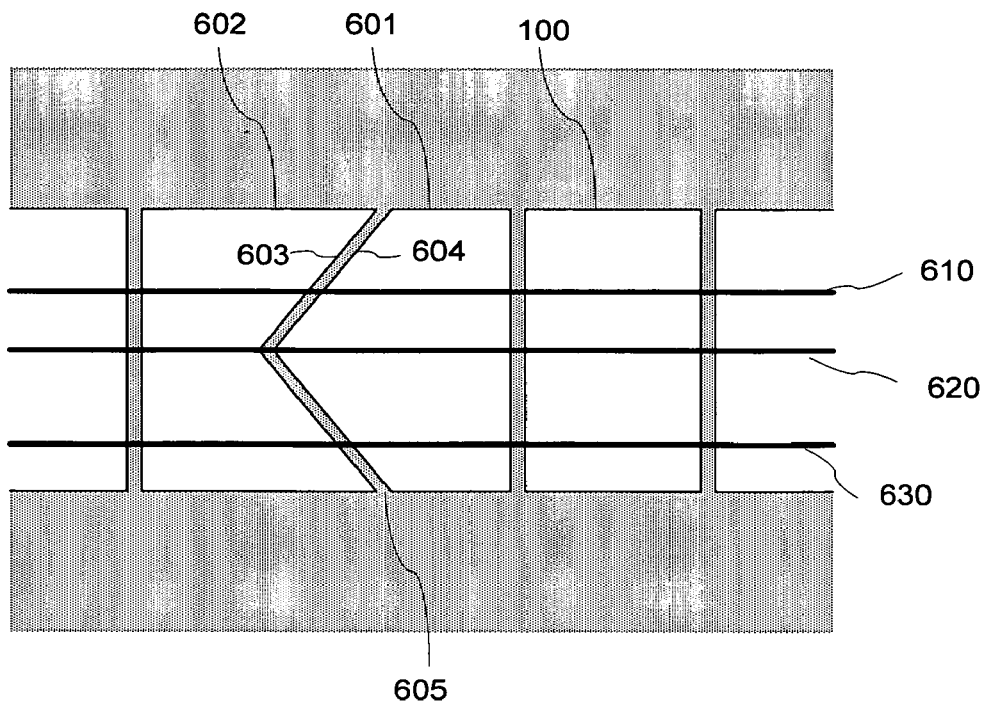
FIG. 7A is a diagram of a pixel configuration having monitoring pixels with a doubly sloped uniform gap.
Figure 7B:
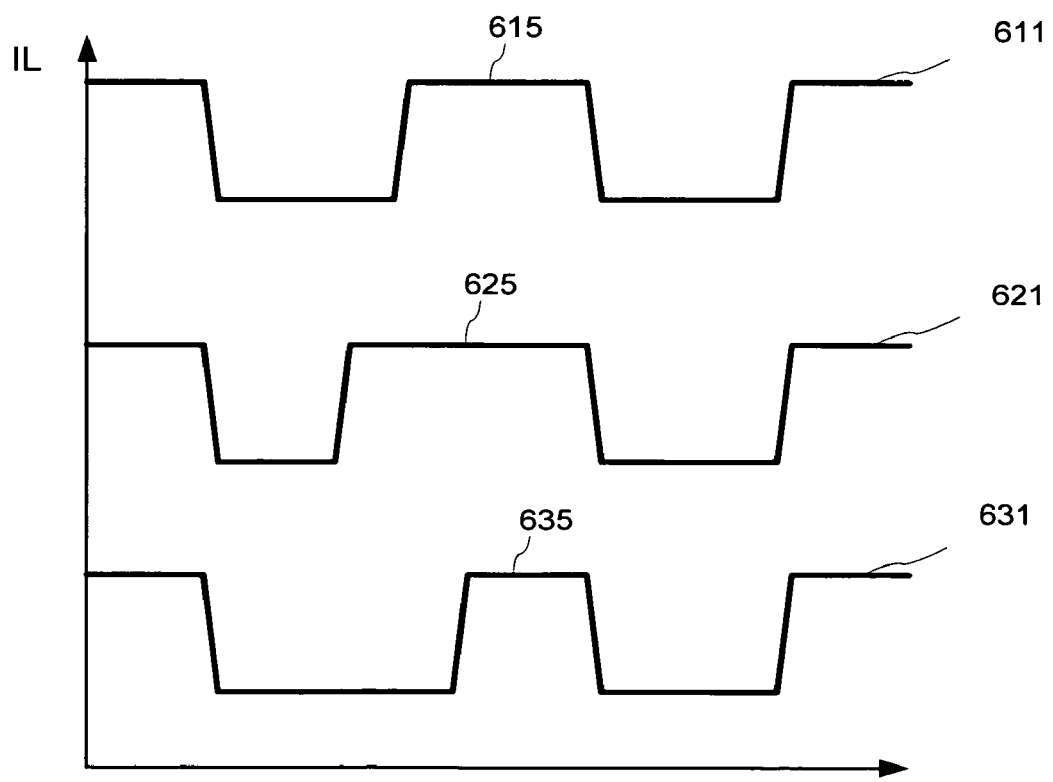
FIG. 7B is a graph of a wavelength response of the pixel configuration shown in FIG. 7A depending on the beam position.

In yet another embodiment, which is shown in FIG. 7A, the monitoring pixel configuration according to the present invention comprises two monitoring pixels 601 and 602 with complimentary-shaped double slanted edges 603 and 604 respectively, the edges facing each other forming a doubly-slanted gap 605 therebetween. Pixel 602 has a width that has a minimum in a middle portion thereof, while pixel 601 has a width that has a maximum in the middle portion thereof. This pixel configuration possesses greater absolute accuracy for aligning the beam to a single position, the position along a line 620 of the beam in the exemplary embodiment shown in FIG. 7A, because it works on achieving a local extremum of a spectral feature associated with the monitoring pixel. This is exemplified in FIG. 7B showing wavelength responses 611, 621, and 631 for the three beam positions 610, 620, and 630 in the pixel configuration of FIG. 7A. The spectral feature to monitor can be for example a spectral width of a feature associated with the monitoring pixel 601, which is labeled with numerals 615, 625, and 635 for the three beam positions 610, 620, and 630 respectively, or spectral positions of features associated with the pixel 602, or the edges 604 or 603. Advantageously, this configuration overcomes rounding of a spectral feature that might occur due to fringing fields, e.g. in an LC-based system, diffraction, beam aberrations, etc., which would reduce the accuracy of the determination of beam position with respect to the pixel array. This configuration is therefore well suited for achieving optimum initial alignment of an optical system employing the array-beam arrangement described herein.

Figure 8A:
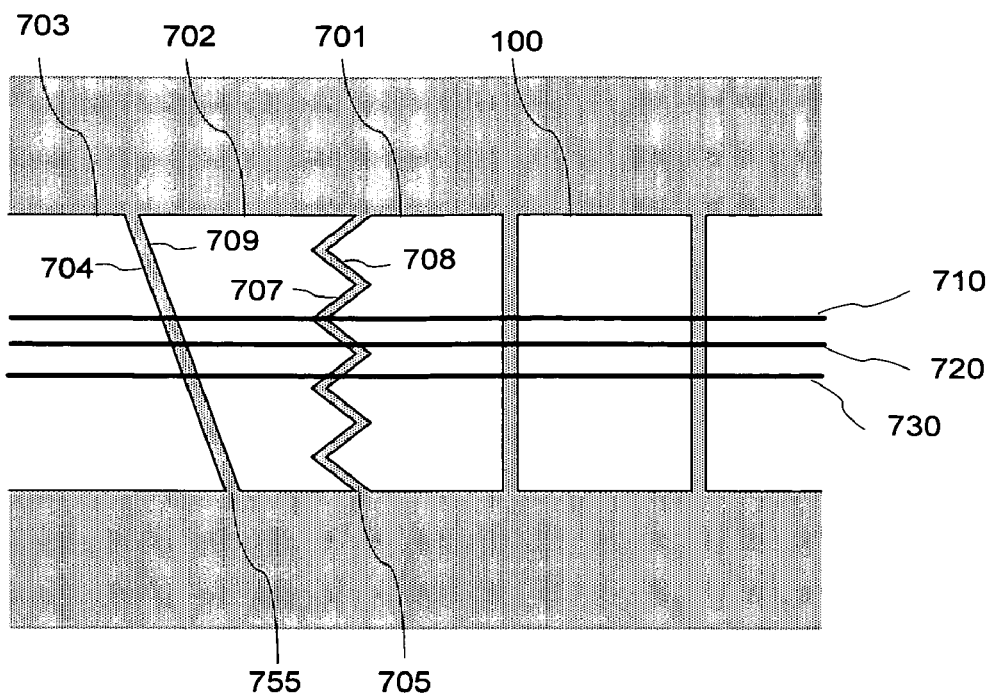
FIG. 8A is a diagram of a Vernier pixel configuration having monitoring pixels with periodically varying width.

Other embodiments of the monitoring pixel configuration according to the present invention can include monitoring pixels having a saw-shaped edge, so that their width periodically increases and decreases in the vertical direction. FIG. 8A shows an embodiment combining pixels with saw-shaped edges with the uniform slanted gap feature described hereinabove with reference to FIGS. 5A and 5B, forming a Vernier-type monitoring configuration and providing together an improved accuracy in assessing movement of the beam relative to the array.

Figure 8B:
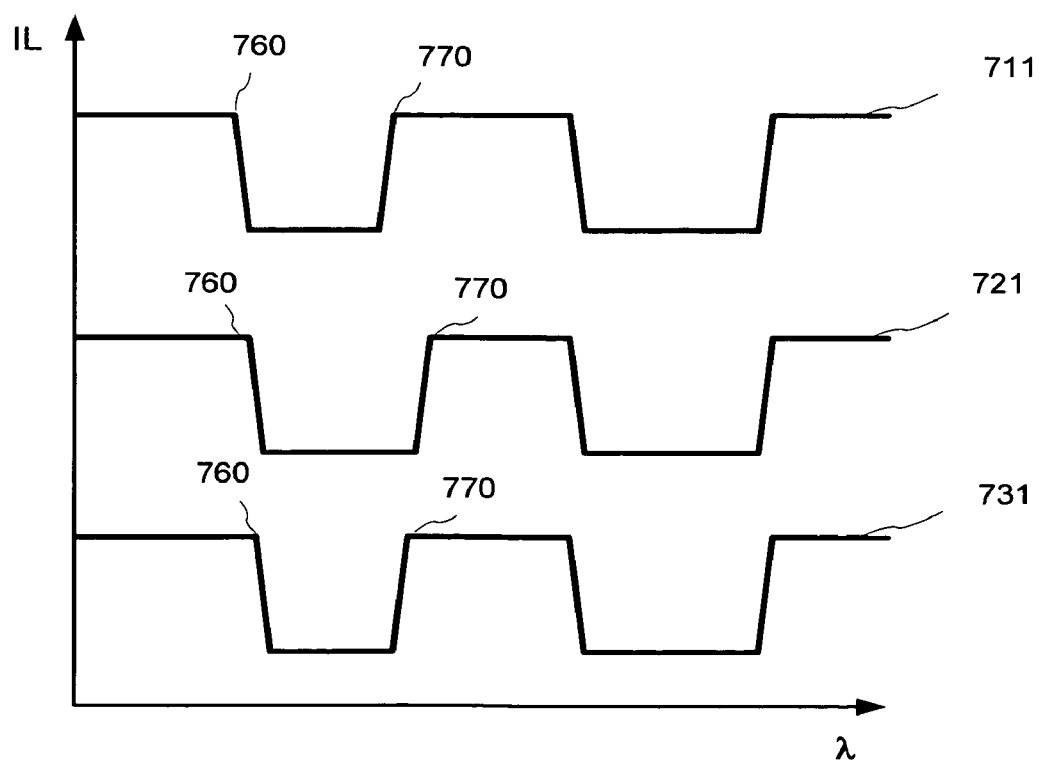
FIG. 8B is a graph of a wavelength response of the pixel configuration shown in FIG. 8A depending on the beam position.

The configuration shown in FIG. 8A includes two monitoring pixels of periodically varying width 701 and 702 having complimentary saw-shaped edges 708 and 707 forming therebetween a "zig-zag" gap 705 of a uniform width. The pixel 702 has a second sloped edge 709 facing a third monitoring pixel 703 having a complimentary-shaped edge 704 to form a slanted gap 755 of a uniform width. The combination of the slanted gap 755 and the saw-shaped, "zig-zag" gap 705 produces spectral features in the wavelength response that vary differently with the beam movement, enabling more accurate identification of the beam position across the monitoring pixels. FIG. 8B shows wavelength responses 711, 721, and 731 for the beam positions 710, 720, and 730 respectively across the Vernier pixel configuration. By way of example, wavelength position of two spectral features 760 and 770 associated with the edges 704 and 708 of the monitoring pixels 703 and 701 change differently with the vertical beam movement, one varying periodically and the other varying monotonically.

The preferred embodiment of this invention makes use of the Vernier configuration shown in FIG. 8A with monitoring pixels located at both ends of the array. The zig-zag feature of the Vernier configuration of the monitoring pixels maximizes the local slope of the pixel edge while minimizing the extent of the feature along the array. While this increases the sensitivity to small beam movements, it also results in an ambiguity due to the periodicity. To overcome this ambiguity, the zig-zag feature is used in the above-described configuration in conjunction with a sloped feature offering coarser resolution. This combination offers both fine and coarse resolution enabling the user to determine the beam position within the array.

Advantageously, all of the embodiments described hereinbefore enable identification of the beam position in both the x and y directions. Since each of the aforedescribed embodiments uses at least one slanted pixel edge, i.e. an edge which is, at least locally, inclined to they axis by an angle $\theta \neq 0$, the identification of the vertical and horizontal beam movement can be described in reference to the slanted-gap configuration of the monitoring pixels, as illustrated in FIGS. 9A and 9B.

Figure 9A:
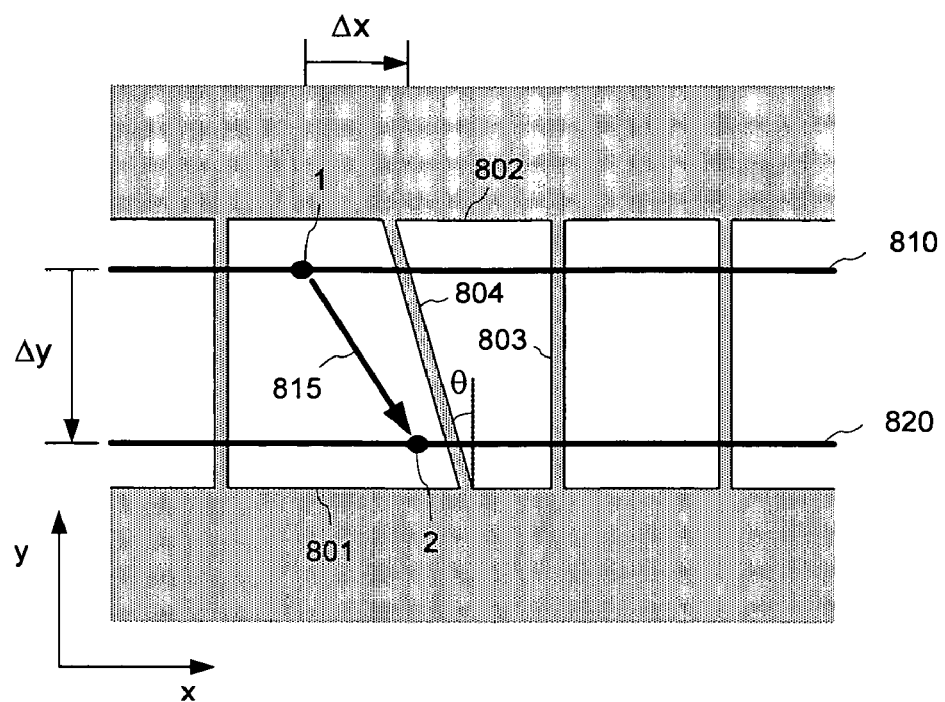
FIG. 9A is a diagram of beam movement in a pixel configuration with a uniform slanted gap.
Figure 9B:
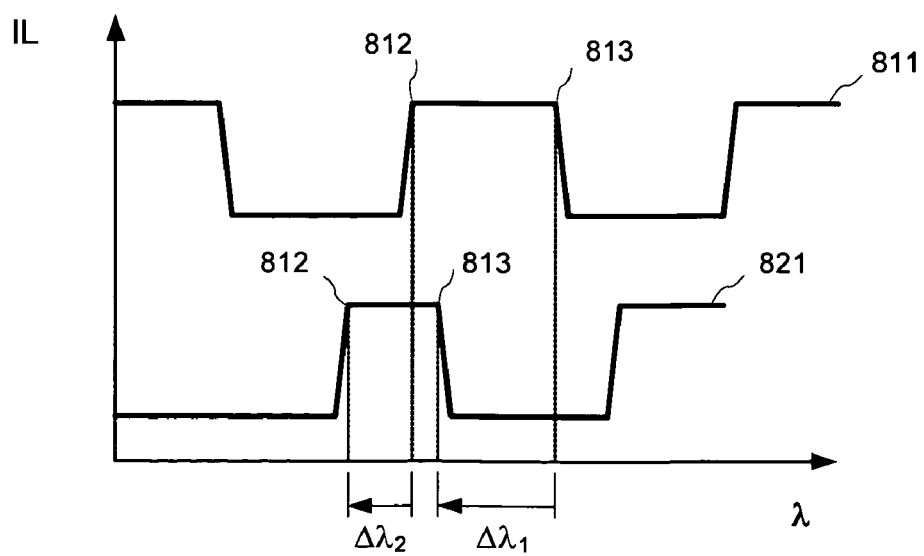
FIG. 9B is a graph showing a change in wavelength response of the pixel configuration shown in FIG. 9A due to the beam movement.

FIG. 9A shows a movement of the dispersed optical beam from a position 810 to a position 820 simultaneously in the x and y directions, the movement described by an arrow 815, so that a spectral component corresponding to a wavelength $\lambda'$ moves from a location 1 to a location 2 on a wedge-shaped monitoring pixel 801. FIG. 9B schematically shows a resulting change in the wavelength response of the picture configuration shown in FIG. 9A, wherein the wavelength response 811 corresponds to the beam position 810, and the wavelength response 821 corresponds to the beam position 820. The beam movement can be deduced by identifying changes in wavelength positions of spectral features associated with the monitoring pixels 802 and 801.

By way of example, a change $\Delta\lambda_1$ in the wavelength position of a spectral feature 813 associated with a straight edge 803 of the pixel 802 results from the horizontal movement of the beam $\Delta x$ only, and is directly determined by the dispersion D of the optical system, $D = d\lambda/dx$, according to equation (1):

$$\Delta\lambda_1 = -D \cdot \Delta x. \quad (1)$$

The movement of the beam in they direction by $\Delta y$ is deduced from a spectral shift $\Delta\lambda_2$ of a spectral feature 812 associated with the sloped edge 804 of the wedge-shaped pixel 802. Indeed, the wavelength shift $\Delta\lambda_2$ of the spectral feature 812 of the sloped gap is given by equation (2):

$$\Delta\lambda_2 = \Delta\lambda_1 + D \cdot \Delta y \cdot \tan(\theta) \quad (2)$$

Equations 1 and 2 are then solved to deduce the beam shift $(\Delta x, \Delta y)$ from the measured spectral shifts $\Delta\lambda_1$ and $\Delta\lambda_2$.

Figure 10A:
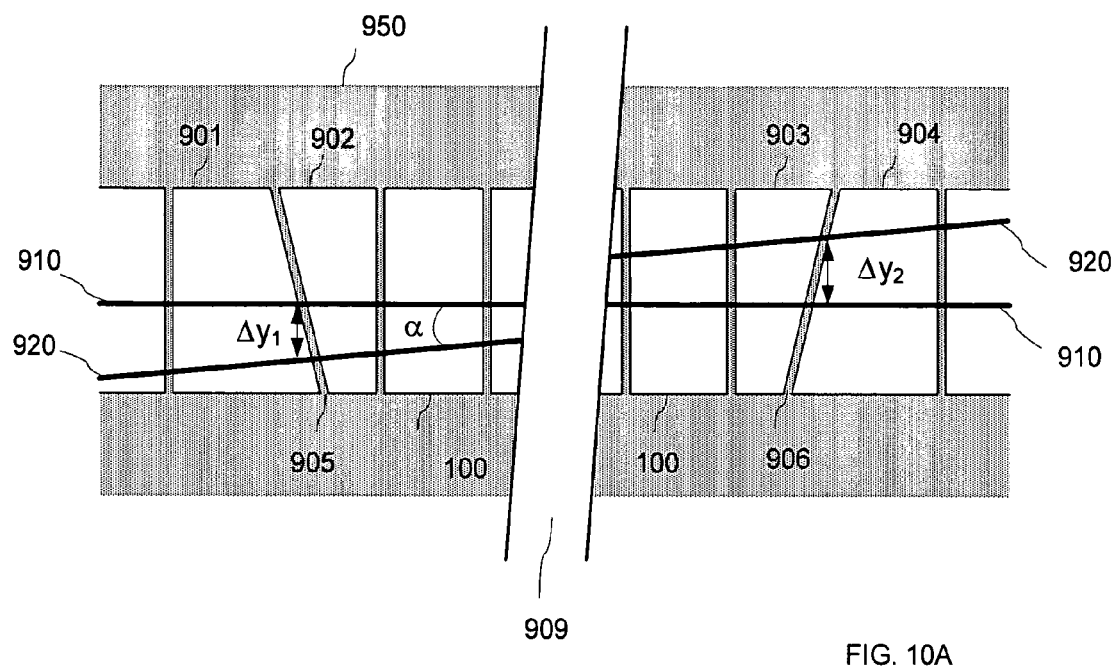
FIG. 10A is a diagram of a pixel array having monitoring pixels at the ends thereof and two alignments of the beam.
Figure 10B:
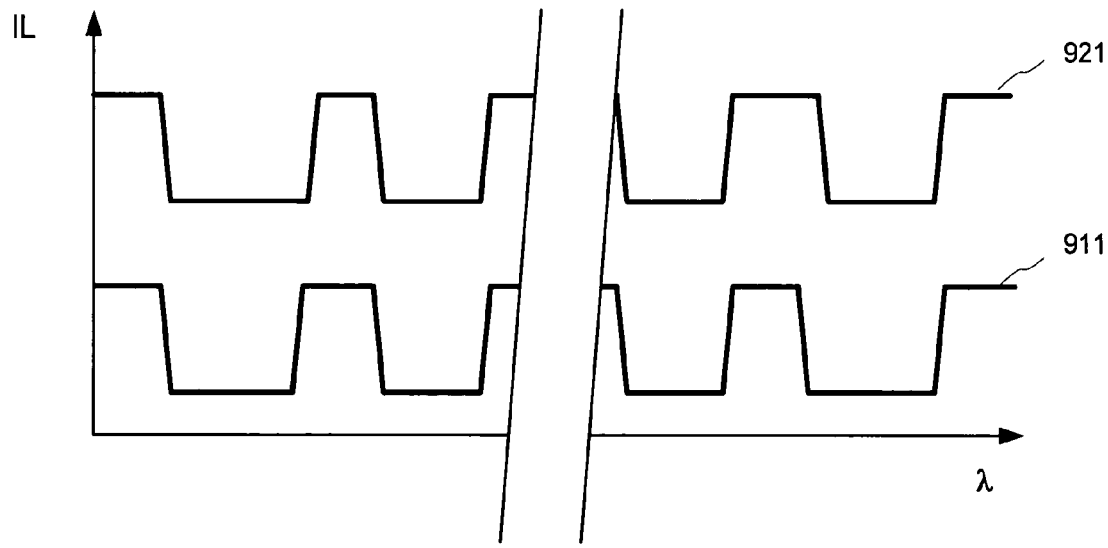
FIG. 10B is a graph showing a change in wavelength response of the pixel array shown in FIG. 10A due to the beam tilt.

As stated hereinabove, the beam tilt can be deduced by disposing monitoring pixels in the end portions of the pixel array. FIG. 10A shows the end portions of a linear pixel array 950 according to the present invention, wherein pairs of wedge-shaped monitoring pixels 901, 902 and 903, 904 are disposed. A central portion of the pixel array 950 comprised of rectangular pixels 100 is not shown and is instead schematically represented in the figure by a fictitious gap 909. Line 920 shows a tilted beam position, while line 910 represents a target position of the beam wherein it is aligned with the array axis 955. A tilt angle $\alpha$ for the beam position 920 can be easily determined by identifying vertical beam shifts $\Delta y_1$ and $\Delta y_2$ at the sloped gaps 905 and 906 between the monitoring pixels at the opposing ends of the array 950 using the following equation:

$$\tan(\alpha) = (\Delta y_1 - \Delta y_2)/L,$$

wherein L is a distance between the slanted gaps 905 and 906.

Deducing the beam position from wavelength shifts of spectral features associated with the monitoring pixel edges as described hereinabove is one embodiment of the method of the present invention. Other possible embodiments thereof include determining changes in the spectral widths of spectral features associated with the monitoring pixels, i.e. determining a wavelength difference between spectral features corresponding to monitoring pixel edges, determining ratios of the spectral widths of features related to multiple monitoring pixels, etc. These methods may be less sensitive to aberrations of the optical system, fringing fields in an LC device, and diffraction effects.

The description given hereinabove was limited to a few exemplary embodiments illustrating the use of monitoring pixels in the pixel array with beam alignment features according to the present invention. Other possible embodiments include combinations of the various configurations described hereinabove, including multiple Vernier configurations, staggered Vernier configurations, etc.

Further, the method of the present invention, wherein the beam alignment is determined by adding monitoring pixels to the array, can be applied to any pixelated array, including, without limitation, arrays constructed from liquid crystal cells or micro-electromechanical systems (MEMS), and two-dimensional and three-dimensional arrays. Note that the aforedescribed interleaving of "off" and "on" pixels for identifying spectral features associated with the monitoring pixels may not be required if the gaps between adjacent optical elements of the array, or pixels, is sufficiently wide to give rise to an insertion loss signature indicative of the gap position, as is typically the case for arrays of micro-mirrors in e.g. MEMS-based systems.

The invention is applicable whether the optical system has a single wavelength dispersed beam, or multiple beams, and can be used for an initial alignment of the optical system, or to detect alterations of the optical alignment of the system that may adversely impact performance during its lifetime.

Of course numerous other embodiments may be envisioned without departing from the spirit and scope of the invention.

What is claimed is:

1. An array of optical elements for processing a light beam spectrally dispersed along a first axis, the array comprising:
   a plurality of optical elements disposed along a second axis, each optical element having a beam receiving surface coplanar with the second axis for receiving a portion of the spectrally dispersed beam, the plurality of optical elements comprising:
   a) a first set of optical elements each having a width of the beam receiving surface which is substantially constant in a direction normal to the second axis; and,
   b) a second set of optical elements each having a width of the beam receiving surface which changes in a direction normal to the second axis;
   wherein the second set comprises at least one optical element for providing a spectral feature dependent on the beam position relative to the second axes.

2. An array of optical elements according to claim 1, wherein the first set of optical elements comprises rectangular optical elements having two opposite edges perpendicular to the second axis.

3. An array of optical elements according to claim 2, wherein the second set of optical elements comprises an optical element having a slanted edge facing an adjacent optical element.

4. An array of optical elements according to claim 2, wherein the second set of optical elements comprises two optical elements separated by a gap having a width varying in a direction normal to the second axis.

5. An array of optical elements according to claim 2, wherein the second set of optical elements comprises an optical element the width of which has one of a maximum or a minimum in a portion thereof between and excluding the ends.

6. An array of optical elements according to claim 2, wherein the second set of optical elements comprises an optical element having a width periodically increasing and decreasing in the direction normal to the second axis.

7. An array of optical elements according to claim 2, wherein the width of at least one optical element from the second set of optical elements has multiple local maximums in a direction normal to the second axis.

8. An array of optical elements according to claim 7, wherein the multiple local maximums of the width of the at least one optical element from the second set form a sequence of local maximums in the direction normal to the second axis, wherein each consecutive local maximum exceeds all preceding local maximums from the sequence of local maximums.

9. An array of optical elements according to claim 4, wherein the width of the gap separating two optical elements varies periodically in the direction normal to the second axis.

10. An array of optical elements according to claim 1, wherein the second set of optical elements comprises at least two optical elements with the first set of optical elements disposed therebetween.

11. An array of optical elements according to claim 1, wherein the optical elements are pixels of a liquid crystal cell.

12. An array of optical elements according to claim 2 wherein:
   the first set of optical elements forms a central portion of the array of optical elements related to a nominal operating wavelength range thereof,
   the second set of optical elements includes a first group of monitoring optical elements disposed at one end of the central portion of the array, and
   a second group of monitoring optical elements disposed at the other end of the central portion of the array;
   wherein each of the first and second groups of monitoring optical elements comprises:
   a) an optical element having a slanted edge facing a neighboring optical element having a complimentary slanted edge, thereby forming a uniform slanted gap therebetween; and,
   b) an optical element having a saw-shaped edge facing a neighboring optical element having a complimentary saw-shaped edge thereby forming a zig-zag shaped gap therebetween.
   wherein the optical elements with the slanted edges and the optical elements with the saw-shaped edges are for providing spectral features for, respectively, a coarse and a fine determination of the beam position relative to the array; and,
   wherein the first group of monitoring optical elements and the second group of monitoring optical elements are for determining a tilt of the first axis relative to the second axis.

13. An array of optical elements according to claim 1, wherein the optical elements are micro-mirrors.

14. An array of optical elements according to claim 1, further comprising optical elements arranged in a 2-d array.

15. A method for detecting alignment of a beam of light dispersed along a first axis relative to a linear array of rectangular optical elements disposed along a second axis, the method comprising the steps of:
   providing at least one monitoring optical element for receiving a portion of the beam of light, the monitoring optical element having a width varying in a direction orthogonal to the second axis;
   providing sensing means for measuring the portion of the beam of light received by the monitoring optical element; and,
   measuring the portion of the beam of light received by the monitoring optical element for determining a relative position of the first and second axes at the monitoring optical element.

16. A method according to claim 12, wherein the step of measuring the portion of the beam of light received by the monitoring optical element comprises the step of detecting a wavelength in said portion of the beam of light.

17. A method according to claim 13, wherein the step of measuring the portion of the beam of light received by the monitoring optical element comprises the steps of:
obtaining a combined spectral response of the monitoring optical element and at least a portion of the linear array of rectangular optical elements; and,
identifying a spectral feature associated with the monitoring optical element in the combined spectral response.

18. A method according to claim 12, wherein the optical elements are pixels of a liquid crystal cell.

19. A method according to claim 12, wherein the optical elements are micro-mirrors.

* * * * *